US012563462B2

(12) United States Patent
Pons Masbernat et al.

(10) Patent No.: US 12,563,462 B2
(45) Date of Patent: Feb. 24, 2026

(54) METHOD FOR OPTIMIZING AN INTERCELL HANDOVER IN A MOBILE NETWORK AND ASSOCIATED SYSTEM

(71) Applicants:AIRBUS DS SLC, Elancourt (FR); AIRBUS DEFENCE AND SPACE SAU, Madrid (ES)

(72) Inventors: Xavier Pons Masbernat, Montigny-le-Bretonneux (FR); Eric Georgeaux, Montigny-le-Bretonneux (FR); Jean-Christophe Schiel, Coignières (FR); Carlos Gomez Calero, Getafe (ES)

(73) Assignees: AIRBUS DS SLC, Elancourt (FR); AIRBUS DEFENCE AND SPACE SAU, Madrid (ES)

( * ) Notice: Subject to any disclaimer, the term of this patent is extended or adjusted under 35 U.S.C. 154(b) by 406 days.

(21) Appl. No.: 18/253,477

(22) PCT Filed: Nov. 17, 2021

(86) PCT No.: PCT/EP2021/081935
§ 371 (c)(1),
(2) Date: May 18, 2023

(87) PCT Pub. No.: WO2022/106445
PCT Pub. Date: May 27, 2022

(65) Prior Publication Data
US 2024/0007915 A1      Jan. 4, 2024

(30) Foreign Application Priority Data
Nov. 18, 2020     (FR) ...................................... 2011835

(51) Int. Cl.
H04W 36/00        (2009.01)
H04W 36/08        (2009.01)
H04W 36/32        (2009.01)

(52) U.S. Cl.
CPC . H04W 36/00835 (2018.08); H04W 36/0058 (2018.08); H04W 36/08 (2013.01); *H04W 36/324* (2023.05)

(58) Field of Classification Search
CPC ......... H04W 36/00–385; H04W 24/10; H04W 36/0058; H04W 36/00835;
(Continued)

(56) References Cited

U.S. PATENT DOCUMENTS

2018/0233055  A1      8/2018   Damnjanovic et al.
2019/0306768  A1     10/2019   Kim et al.

FOREIGN PATENT DOCUMENTS

EP          3110203  A1 *  12/2016   ........ H04W 36/0094
EP          3 709 709  A1    9/2020

OTHER PUBLICATIONS

Merriam-Webster meaning of "record", printed on Aug. 18, 2024. Retrieved from Internet: <https://www.merriam-webster.com/dictionary/record> (Year: 2024).*
(Continued)

*Primary Examiner* — Ronald Eisner
(74) *Attorney, Agent, or Firm* — Pillsbury Winthrop Shaw Pittman LLP

(57) ABSTRACT

A method for a user equipment to preselect at least one base station in a mobile network, the user equipment being attached to an associated base station of the plurality of base stations, the method being implemented by the user equipment and including receiving a signal from each base station of the plurality of base stations; measuring at least one characteristic of each received signal, the measurement
(Continued)

including the creation of a report including all of the assigned values; preselecting at least one base station according to at least one criterion relating to the user equipment and the measurement carried out in the measurement stage; modifying at least one value of the report created in the measurement stage according to the preselection, and sending the report to the associated base station.

12 Claims, 3 Drawing Sheets

(58) Field of Classification Search
CPC ......... H04W 36/0085; H04W 36/0094; H04W 36/08; H04W 36/324; H04W 36/30; H04W 36/304; H04W 36/36; H04W 72/542; H04W 72/543
See application file for complete search history.

(56) References Cited

OTHER PUBLICATIONS

Translation of publication No. EP 3110203, printed on Oct. 20, 2025, retrieved from Internet: <https://patents.google.com/patent/EP3110203A1/en?oq=EP+3110203> (Year: 2025).*
International Search Report as issued in International Patent Application No. PCT/EP2021/081935, dated Feb. 3, 2022.

* cited by examiner

30

METHOD FOR OPTIMIZING AN INTERCELL HANDOVER IN A MOBILE NETWORK AND ASSOCIATED SYSTEM

CROSS-REFERENCE TO RELATED APPLICATIONS

This application is the U.S. National Stage of PCT/EP2021/081935, filed Nov. 17, 2021, which in turn claims priority to French patent application number 2011835 filed Nov. 18, 2020. The content of these applications are incorporated herein by reference in their entirety.

TECHNICAL FIELD OF THE INVENTION

The technical field of the invention is that of communications within mobile networks.

The present invention relates to a method for optimising handover in a mobile network and an associated system and in particular a method implemented by a user equipment, the user equipment modifying the signal measurement reports it transmits to the base station to which it is attached in order to restrict cell selection and limit handovers.

TECHNOLOGICAL BACKGROUND OF THE INVENTION

In communications within mobile networks such as fourth generation ("4G") and fifth generation ("5G") networks, pieces of user equipment (UE) are attached to base stations (BS). A base station covers a geographical zone called a "cell". As pieces of user equipment are mobile, they are likely to change cell and therefore attachment base station. These changes of attachment base station are also called handovers.

In cellular networks, for example those defined by the 3rd Generation Partnership Project (3GPP) and especially 4G LTE (Long Term Evolution) or 5G NR (New Radio), these handovers are carried out in the way described in FIG. 1.

FIG. 1 shows a schematic representation of a known handover in a cellular network.

The system represented in FIG. 1 comprises one piece of user equipment (UE) 10 and three base stations 21 to 23, each forming a cell in the cellular network. The user equipment 10 moves for example in a direction of travel along the thick arrow (towards the base station 23). For its communications within the network, the user equipment 10 is attached to the base station 21, this attachment being represented by a solid line. In the method implemented by 3GPP, the handover decision is made by the attachment base station 21. It is therefore the base station 21 that will decide whether a handover of the user equipment 10 to one of the base stations 22 or 23 has to take place. This decision is made by the attachment base station 21 according to measurements carried out by the user equipment 10 and transmitted to the attachment base station 21.

Each base station 21 to 23 periodically transmits reference signals (RS). These signals, known to the user equipment 10, are received by the latter. The user equipment 10 then measures, for each reference signal it receives, the RSRP ("Reference Signal Received Power") and the RSRQ ("Reference Signal Received Quality"). RSRP is expressed in watts or dBm (decibel-milliwatts). RSRQ is defined as the ratio of RSRP to RSSI (Received Signal Strength Indicator) and is expressed in dB (decibels).

These measurements are periodically transmitted to the attachment base station 21 or according to a specific event predetermined by the attachment base station 21 in an "M:RSRP,RSRQ" communication represented in FIG. 1. The attachment base station 21 thus receives all the measurements carried out for all the signals received by the user equipment 10, that is, for all the base stations accessible by the user equipment 10 during a given period. With this information, the attachment base station 21 compares the RSRQ or RSRP measured by the user equipment 10 of the signal it has itself transmitted with the RSRQ or RSRP measured by the user equipment 10 for the other base stations 22 and 23 and decides when and how to carry out a handover from the user equipment 10 to another attachment base station 22 or 23. For example, in FIG. 1, the attachment base station 21 may decide to carry out a handover of the user equipment 10 to the cell formed by the base station 22, as the measurements give higher values. Once this decision has been made, the attachment base station 21 informs the chosen attachment base station (for example 22) in a "!HO" communication so that the base station 22 can prepare the resources necessary for the handover and then informs the user equipment 10 in a "!HO:22" communication of this change of attachment base station.

When the user equipment 10 is moving, handovers may occur very often. For example, the user equipment 10 may be an aeroplane. An aeroplane comprising a plurality of directional antennas pointing in different directions can reach a ground speed of 1,200 kilometres per hour. Since each base station 21 to 23 has a range of, for example, 30 kilometres, the maximum average duration for which an aeroplane is attached to a base station is then only 90 seconds. As there are no obstacles between the base station and the user equipment 10, a line-of-sight situation can be contemplated as well as a free space propagation channel. At these speeds and under free space propagation conditions between the user equipment (the aeroplane) and all the base stations on the ground, a large proportion of the base stations 21 to 23 are measured by the user equipment, potentially much more than with conventionally ground-based user equipment, and potentially with very similar signal strengths. All of these measurements are reported using the standard mechanism previously described and in FIG. 1. However, measurements from neighbouring cells will have very close RSRP and RSRQ values due to the line-of-sight propagation conditions. Such reports to the serving base station may lead to a non-optimal selection of cells for handovers, resulting in an increase in the number of handovers.

A large number of handovers has an impact on the throughput of the user equipment (the aeroplane) since a 20-30 ms break occurs each time a handover is performed. This is due to the nature of handover in 4G or 5G networks, which is a so-called "hard" handover also called "break-before-make". Thus, there are additional connection breaks and signals needed to keep up with all the handover procedures, which results in a considerable drop in throughput and latency.

Furthermore, measurements can be biased due to the attitude of the user equipment, especially due to the orientation of the directional antennas on board. The user equipment then has to correct the raw measurements according to its known attitude, in particular according to the roll and pitch of the aeroplane when the user equipment is an aeroplane or is included in an aeroplane.

Thus, as many base stations may be measured by the user equipment with measurements having very close values due to the specificities of the application to a flying mobile device, there is a need for a method allowing better throughput and latency than the state of the art, while having a relevant selection of the attachment base stations.

SUMMARY OF THE INVENTION

The invention provides a solution to the problems previously discussed, by allowing the attachment base station to select only relevant base stations by means of a preselection of base stations by the user equipment.

One aspect of the invention relates to a method for preselecting at least one base station from a plurality of base stations, a user equipment and the plurality of base stations being included in a mobile network, the user equipment being attached to an attachment base station of the plurality of base stations, each base station forming a cell of the mobile network, the method comprising the steps of:

receiving, by the user equipment, a signal from each base station of the plurality of base stations, measuring, by the user equipment, at least one characteristic of each signal received from the plurality of base stations, measuring comprising assigning at least one value associated with each base station according to the at least one characteristic of each signal and creating a report comprising all the assigned values, preselecting at least one base station from the plurality of base stations according to at least one criterion relating to the user equipment and the measurement carried out in the measurement step, modifying at least one value of the report created in the measurement step, the at least one modified value being associated with the at least one preselected base station.

By means of the invention, the user equipment preselects a group of base stations or at least one base station according to criteria relating to information on the user equipment, making it possible to "relocate" part of the intelligence and decision-making capacities of the attachment base station to the user equipment. Thus, exchanges between the user equipment and the attachment base station are limited and the number of untimely handovers is limited by promoting with the attachment base station more appropriate base stations than the attachment base station.

A base station is considered "relevant" or "appropriate" when it has a real advantage over the current attachment base station, that is, when it allows better communications while ensuring that changing the attachment base station for this new base station does not have a cost in terms of throughput and latency that is too high compared to the gain. Thus, the invention makes it possible to "promote" certain base stations to the attachment base station and to "handicap" others, in order to ensure that certain base stations which would normally be selected are not selected because the gain of a handover to them is not significant enough with regard to the cost in throughput and latency that it would generate.

For example, measurement values relating to signals from neighbouring cells that are strongly received by the forward-pointing antenna of a moving user equipment can be modified to be more "attractive" so that the network increases the probability of triggering a handover to these cells.

In contrast, cells that are identified as being on the side of the aeroplane trajectory can be made "less attractive" in the measurement reports so that they are low priority candidates for a handover.

By "preselecting", it is meant at least one base station, determining at least one base station to be "promoted" or "favoured" or "handicapped" or "disadvantaged". Preselecting may comprise promoting one or more base stations, handicapping one or more base stations, or a combination of promoting at least one base station and handicapping at least one other base station. A base station will hereafter be considered as promoted or handicapped in comparison with other non-promoted and non-handicapped base stations during the selection carried out by the attachment base station implementing the known method as defined for example by 3GPP for selecting a base station for a handover.

In addition to the characteristics just discussed in the preceding paragraph, the preselection method according to one aspect of the invention may have one or more complementary characteristics among the following, considered individually or according to all technically possible combinations:

in the step of modifying at least one value of the report, the at least one value is modified by adding or subtracting a predetermined value.

the predetermined value is added to or subtracted from the at least one value of the report if the base station associated with the value belongs to the at least one preselected base station.

the at least one criterion relating to the user equipment takes account of at least one of the following information on the user equipment:

the attitude of the user equipment, the speed of the user equipment, the altitude of the user equipment, at least one piece of information about a plurality of antennas of the user equipment, the predetermined value is predetermined according to the at least one piece of information taken into account, the at least one criterion is selected from:

the direction of the cell of each base station, determined from the arrangement of the antennas of the user equipment and the value of the measured characteristic of each received signal, the value of the Doppler shift of the signal received from each base station, the change over time in the received power, a confidence level of the user equipment determined from the attitude, speed and/or altitude of the user equipment, the preselection and modification steps are implemented by the user equipment and the preselection method further comprises a step of sending the report to the attachment base station, the preselection and modification steps are implemented by the attachment base station and the preselection method further comprises, prior to the preselection and modification steps, a step of receiving the report by the attachment base station.

the preselection method further comprises, prior to the preselection and modification steps, a step of receiving at least one of the information on the user equipment by the attachment base station.

Another aspect of the invention relates to a method for optimising handover in a mobile network comprising a plurality of base stations and at least one piece of user equipment, each base station forming a cell of the mobile network, the user equipment being attached to an attachment base station of the plurality of base stations, a handover decision being taken by the attachment base station according to measurements carried out by the user equipment, the optimisation method being characterised in that it comprises the method for preselecting base stations according to the invention implemented by the user equipment and at least the steps of:

receiving the report by the attachment base station, selecting a base station from the plurality of base stations from the report received by the attachment base station, initiating the handover by the attachment base station.

Another aspect of the invention relates to a system comprising:

at least one piece of user equipment configured to implement the preselection method according to the invention, a plurality of base stations comprising at least one attachment base station to which the user equipment is attached, the attachment base station being configured to implement the handover optimisation method according to the invention.

Another aspect of the invention relates to a system comprising:

at least one piece of user equipment, a plurality of base stations comprising at least one attachment base station to which the user equipment is attached, the attachment base station being configured to implement the preselection method according to the invention.

In one embodiment, the user equipment of the system according to one aspect of the invention is an aircraft.

Yet another aspect of the invention relates to a computer program product comprising instructions which, when the program is executed by a computer, cause the same to implement the steps of one of the preselection method according to the invention or the handover optimisation method according to the invention.

Yet another aspect of the invention relates to a computer-readable recording medium comprising instructions which, when executed by a computer, cause the same to implement the steps of one of the preselection method according to the invention or the handover optimisation method according to the invention.

The invention and its different applications will be better understood upon reading the following description and upon examining the accompanying figures.

BRIEF DESCRIPTION OF THE FIGURES

The figures are set forth by way of indicating and in no way limiting purposes of the invention.

DETAILED DESCRIPTION

The figures are set forth by way of indicating and in no way limiting purposes of the invention.

Unless otherwise specified, a same element appearing in different figures has a single reference.

Figure 1:
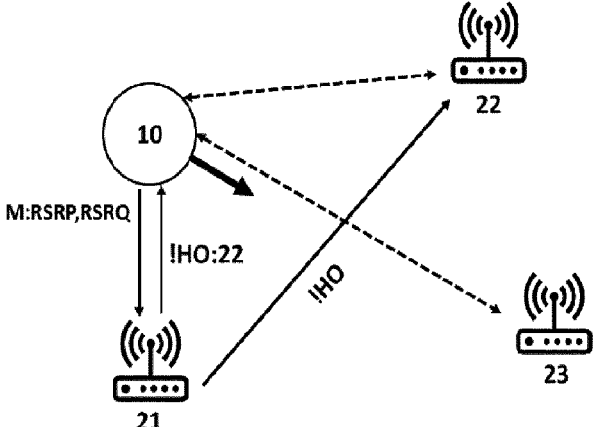
FIG. 1 shows a schematic representation of a handover according to the state of the art.
Figure 2:
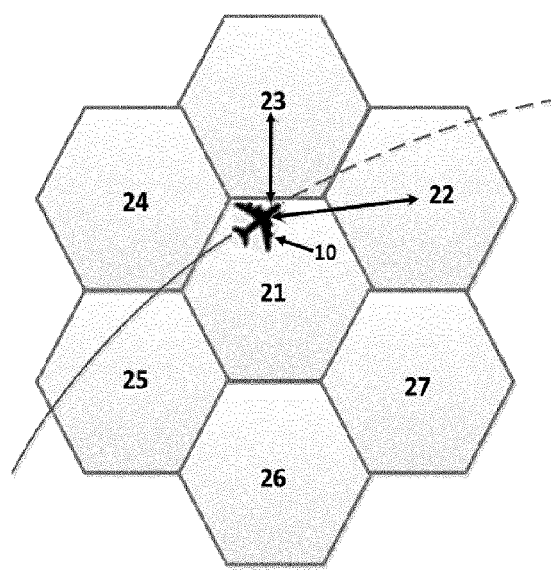
FIG. 2 shows a schematic representation of an aircraft receiving signals from several base stations.

FIG. 2 shows a schematic representation of an aircraft receiving signals from several base stations.

Although FIG. 2 represents an aircraft 10, the invention applies to any device able to act as user equipment 10, that is, any device comprising the means for exchanging within the mobile network. The invention applies to any mobile network of the "cellular" type, that is, whose base stations form cells. Hereinafter, reference may be made interchangeably to a "cell" or a "base station", a base station forming a cell of the network. Such mobile networks may be, but are not limited to, 4G LTE or 5G NR networks. The invention applies to all cellular mobile networks in which a piece of user equipment 10 is attached to a base station 21, and in which a handover is possible, the handover decision resting with the attachment base station 21 of the user equipment 10.

According to a conventional known operation, the aircraft 10 represented in FIG. 2, for example an aeroplane, attached to the base station 21, will be transferred to the base station 23 by a handover, the measurements (for example of RSRP and/or RSRQ) related to the cell formed by the base station 23 being better than the measurements related to the cell formed by the base station 22 for example by its greater proximity with the aircraft. According to this conventional known operation, as the aircraft 10 moves forward, the measurements related to the cell formed by the base station 22 will become better than the measurements related to the cell formed by the base station 23. Thus, this conventional known operation will have achieved two handovers: from base station 21 to base station 23, and then from base station 23 to base station 22.

In contrast, the invention takes account of several parameters and information of the user equipment 10 to limit the number of handovers and to make the handovers of better quality. For this, the system comprising the attachment base station 21 and the user equipment 10 implements the method 30 represented in FIG. 3.

Figure 3:
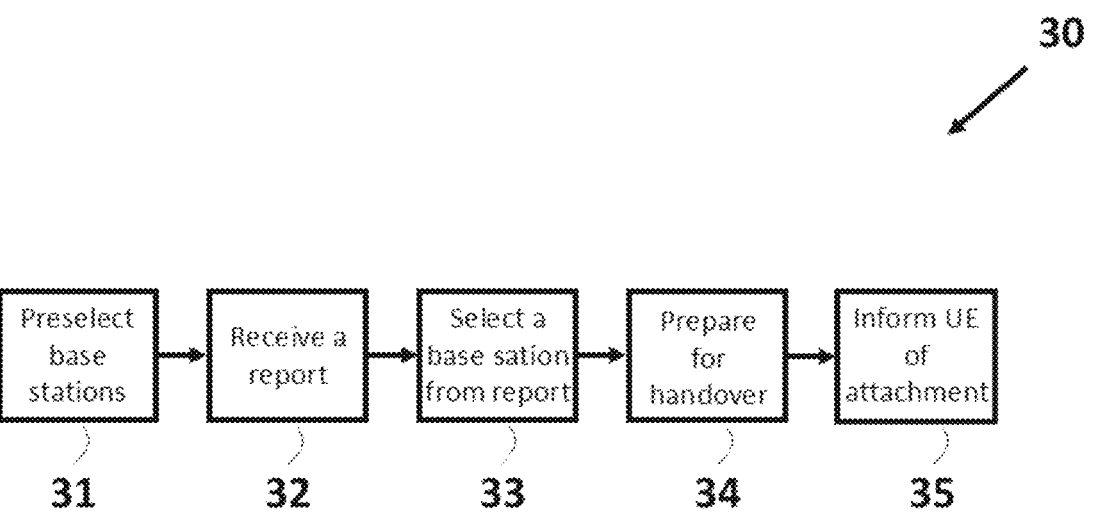
FIG. 3 shows a schematic representation of a handover optimisation method according to one aspect of the invention.

FIG. 3 shows a schematic representation of a handover optimisation method according to one aspect of the invention.

The method 30 for optimising handover comprises at least the five steps 31 to 35 represented in FIG. 3.

The method 30 for optimising handover comprises a first step of preselecting 31 base stations implemented by the user equipment 10.

To implement a step of a method, a device comprises a processor and a memory, the memory storing instructions, which, when executed by the processor, cause the processor to implement the step.

Figure 4:
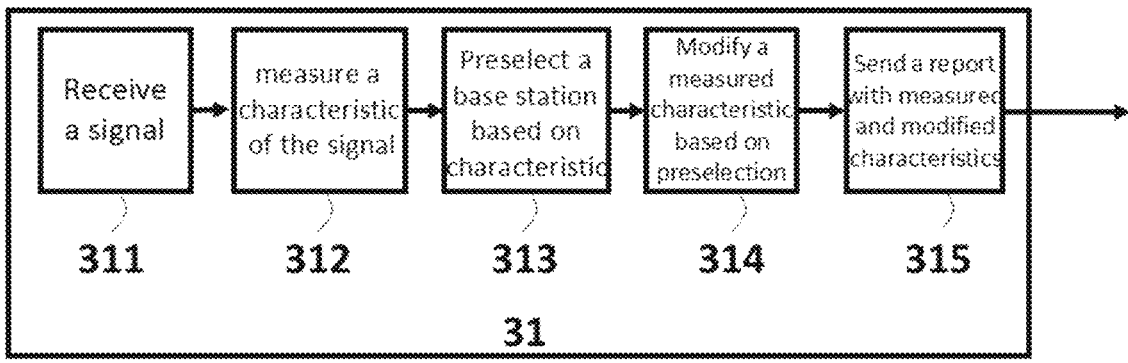
FIG. 4 shows a schematic representation of a method for preselecting base stations according to another aspect of the invention.

The preselection step 31 is described in more detail in FIG. 4. The preselection step makes it possible to preselect candidate base stations for handover, and "promote" or "handicap" these preselected base stations to the attachment base station 21. This is referred to as "preselection" by the user equipment 10 because the attachment base station 21 subsequently selects a base station for handover if required. The attachment base station 21 is a base station of the network through which the user equipment 10 communicates with the rest of the network, especially with other pieces of user equipment in the network.

The step of preselecting 31 base stations comprises five sub-steps 311 to 315, implemented by the user equipment 10.

In a first sub-step 311, the user equipment 10 receives a signal from the accessible base stations 22 and 23, that is, it receives reference signals (RS) from the base stations forming cells to which it can be attached. As indicated in the "state of the art" section, when the user equipment 10 is an aircraft, for example an aeroplane, the communications take place under propagation conditions that can be assimilated to free space propagation. Thus, an aircraft will receive many signals from base stations, some of which are potentially quite distant. For example, in FIG. 2, the user equipment 10 (aeroplane), may receive signals from all the base stations 22 to 27. The preselection step 31 makes it possible to preselect at least one base station from these base stations 22 to 27.

Each time a signal is received, the user equipment 10 implements a sub-step 312 of the method 31 which is a sub-step of measuring at least one characteristic of the received signal. The measurement carried out in sub-step 312 may be a known measurement such as an RSRP/RSRQ measurement as previously set forth, or any other measurement of at least one characteristic of the signal that allows a value to be assigned to the received signal. A measurement comprises assigning a value associated with the base station according to at least one characteristic of the signal.

The measurement sub-step 312 comprises creating a report comprising all the assigned values as well as their associated base stations. Such a report may be made in a known manner, for example in the form of a table comprising, in each row, a received signal measurement and the associated base station. For each measurement carried out, the user equipment 10 thus stores for example in a database (not represented) the value associated with the base station, the database then containing all the measurements that the user equipment 10 performs from each cell it measures over a certain time. Each time a new measurement is performed by the user equipment 10, this new value is added to the corresponding base station in the database. If a specific cell has not been measured previously (not referenced in the database), a new cell (new row) is declared in the database and the value from the measurement is added to that cell (new column). Once the cell is no longer measured for a certain period of time or after a certain number of measurements performed by the user equipment 10, the row corresponding to the cell can be deleted from the database. In addition to the measurements, additional information may be stored in this database, such as the antennas that have received the signal or the antenna coefficients that have been applied to obtain the signal for measurement purposes, information on equipment such as attitude, altitude, speed, etc.

In a sub-step 313 of the method 31, the user equipment 10 carries out preselection of at least one base station from the plurality of base stations 22 to 27 according to at least one criterion relating to the user equipment and the measurement carried out in the measurement sub-step 312.

This preselection aims at deciding which measured cells have to be promoted or which cells have to be handicapped based on several parameters or information. These parameters or information may comprise, without limiting the invention:

measurements related to the cell or base station, for example current measurements and measurement history for each cell, information on the antenna or group of antennas and the coefficients that have been used to obtain the signal of the corresponding cell, for example the coefficients in the case of a maximum-ratio combining (MRC) algorithm as set forth later in the description, the attitude of the user equipment 10, for example pitch, roll and yaw, especially for an aircraft, the speed of the user equipment 1, the altitude of the user equipment 10.

The user equipment 10 makes a decision, that is, carries out preselection, based on at least one of the previously mentioned information, preferably on the combination of different criteria derived from the previously mentioned information. A promotion can be decided for a specific neighbouring cell by adding a positive offset to the measurement values stored in the database in order to favour the corresponding cell for handover, or conversely, a handicap for a specific cell can be decided by designating negative values for that cell in order to reduce the likelihood that the attachment base station will select the cell as a target cell for a handover. A promotion or handicap decided by the user equipment 10 is considered to be a preselection, that is, a base station may be preselected to be promoted or to be handicapped.

In order to carry out a preselection, the user equipment 10 may preferentially estimate the following criteria:

the direction of the neighbouring cell, the absolute Doppler shift, a confidence level.

An estimation of the direction of the neighbouring cell may be derived from the arrangement of the antenna system, for example by knowing the pattern of the antenna system and comparing the signal of the neighbouring cell received by each antenna element. In doing so, it is possible to know whether the user equipment 10 is moving towards or away from the neighbouring cell, or to estimate the sign of the Doppler shift.

The second point is an approximate estimation of the absolute value of the Doppler shift. This value can be derived from the strength of the signal received from the neighbouring cell and by knowing the speed of the user equipment 10.

Furthermore, based on the known arrangement of the antenna system, knowing which antenna has received the signal and the speed of the user equipment 10, it is possible to roughly estimate the attenuation between the user equipment 10 and the neighbouring cell.

Another possible criterion is a confidence level, which is a value to determine whether the user equipment 10 is seeing an environment in which it is confident or whether the environment it is moving towards is unknown from the perspective of the user equipment 10. For example, if the user equipment 10 is an aeroplane travelling at high speed (cruising speed), high altitude and there is no movement of the aeroplane (pitch, roll and yaw variation equal to 0 or very close to 0), it can be assumed that this is a very confident scenario as there will be no sudden movement or change in trajectory. However, if the aeroplane moves at low speed and low altitude, and changes direction (roll different from 0), it can be assumed that the environment, and thus the new cells in front of the aeroplane, will be very recent, and the confidence level the aeroplane may have to this environment is very low. Thus, a potential confidence level scale could be defined as follows (A being the most confident and D the least confident):

A. High speed, high altitude, no attitude change

B. Low speed, high altitude, no attitude change or High speed, low altitude, no attitude change C. Low speed, low altitude, no attitude change D. Low speed, low altitude, attitude change

Taking FIG. 2 as an example, if the aeroplane is in flight, for example, measurements can be obtained from a cell with the following characteristics:

signal intensity increases, high Doppler shift, estimated direction consistent with the direction of the aeroplane trajectory.

These characteristics are representative of a cell or base station that may be a good candidate for handover.

In contrast, measurements can be obtained from a cell with the following characteristics:

signal intensity is stable or decreases, average Doppler shift, estimation of the direction of the cell to the side or rear of the trajectory of the user equipment 10.

These characteristics are representative of a cell or base station that is likely to be a poor candidate for handover and will therefore not be preselected or will be preselected to be "handicapped".

Therefore, the promotion algorithm will favour cells with a stronger signal when coming from the front of the user equipment 10 in the case of an aeroplane (see for example cell N° 22 in FIG. 2) over those with a signal coming from the side of the aeroplane (cells N° 23, 24, 25, 26, 27 in FIG. 2).

In a subsequent sub-step 314, the user equipment 10 modifies at least one value of the report created in the measurement sub-step 312 according to the preselection, the modified value being associated with at least one preselected base station. This modification may for example consist in rising the measured value for a cell preselected to be promoted, and in decreasing the measured value for a cell non-preselected or preselected to be handicapped. Rising and decreasing the value are carried out from predetermined values added to or subtracted from the values stored in the database for the different cells before sending to the attachment base station of the user equipment 10. For example, taking the previous examples, the measurement values for cell 22 will be risen and the measurement values for cells 23 to 27 will be decreased, in order to favour ("promote") cell 22 with the attachment base station 21 and to disadvantage ("handicap") cells 23 to 27 with the attachment base station 21.

The reported measurement values, even if modified, have to remain preferably within the allowed ranges. For example, RSRP values are defined in 3GPP Specification 38.133, and depending on whether they are Level 1 or Level 3, these measurements could range from −140 to −40 dBm and from −156 dBm to −31 dBm respectively, both with 1 dB resolution. An RSRP value after modification has to remain within these bounds.

An example of modifying values is described hereinafter.

The RSRP and RSRQ values included in the report subsequently sent to the attachment base station can be written as follows:

$$RSRP_{reported}(cell_i) = RSRP_{measured}(cell_i) + P_{Offset_i}$$

$$RSRQ_{reported}(cell_i) = RSRQ_{measured}(cell_i) + Q_{Offset_i}$$

with the index "reported" for modified measurements, "measured" for measured values, and "offset" for predetermined values added or subtracted to promote or handicap the cell.

The added amount, that is, the predetermined value, with a positive or negative sign, for an RSRP measurement may for example be:

$$P_{offset_i} = [f_{Doppler}(\Delta_{Doppler_i}) + f_{Antenna}(i) + f_{Power\ Gradient}(\Delta RSRP_i)] \cdot f_{plane}(\text{attitude,speed,altitude})$$

10

With $f_{Doppler}$ a function that promotes, that is, increases the value, when the Doppler shift is high and positive and handicaps, that is, decreases the value when the Doppler shift is high and negative.

A simple implementation of $f_{Doppler}$ can for example be:

$$f_{Doppler}(\Delta f_{Doppler_i}) = 3 \ \text{dB} \cdot \frac{\Delta f_{Doppler_i}}{Doppler_{Max}}$$

With $Doppler_{Max}$ the maximum of the Doppler offset, $\Delta f_{Doppler_i}$ the Doppler offset for the signal received from cell i.

In the formula for $P_{offset}$, $f_{Antenna}$ is a function that promotes the cell in the measurement report when the signal received by the user equipment 10 is received at the antenna pointing in the direction of travel of the user equipment 10. For example, for an antenna with four radiating elements and antenna 0 pointing forward, and $\alpha_{i,0} \ldots \alpha_{i,3}$ the weight obtained by an MRC algorithm to maximise the signal-to-noise ratio of the signal received from cell i, there can be:

$$f_{antenna}(i) = 20\log_{10}\left(\frac{\sqrt{2}\,\|a_{i,0}\| + \|a_{i,1}\| + \|a_{i,2}\| + \|a_{i,3}\|}{\sqrt{\|a_{i,0}\|^2 + \|a_{i,1}\|^2 + \|a_{i,2}\|^2 + \|a_{i,3}\|^2}}\right)$$

Still in the formula for $P_{offset}$, $f_{Power\ Gradient}$ is a function that promotes the cell if the power of the signal received from that cell increases. For example, a simple implementation would be to add 3 dB to the ratio if the received power has increased compared to previous measurements as follows:

$$f_{Power\ Gradient}(\Delta RSRP_i) = 3 \ \text{dB} \cdot \left[\frac{\text{sign}\ (RSRP_i(t_0) - RSRP_i(t_0 - 1)) + 1}{2}\right]$$

Still in the formula for $P_{offset}$, $f_{Plane}$ is a function that defines a factor to improve or moderate (and possibly set to zero) the offset values described above by taking account of the attitude (pitch, roll), altitude and speed of the user equipment 10. For example, a simple version could be $f_{Plane} = 0$ when the user equipment 10 is at an altitude below 3,500 feet and the speed of the user equipment 10 is below 400 km/h. In other cases, the $f_{Plane}$ function could follow a function like:

$$si - \text{pitch}_{max} \le \text{pitch} \le \text{pitch}_{max}\,et - \text{roll}_{max} \le \text{roll} \le \text{roll}_{max}:$$

$$f_{Plane} = \frac{\alpha \cdot \left(\frac{\text{speed}}{\text{speed}_{max}}\right) + \beta \cdot \left(\frac{\text{altitude}}{\text{altitude}_{max}}\right) + \gamma \cdot \left(\frac{A \cdot \frac{|\text{pitch}| - \text{pitch}_{max}}{\text{pitch}_{max}} + B \cdot \frac{|\text{roll}| - \text{roll}_{max}}{\text{roll}_{max}}}{A + B}\right)}{\alpha + \beta + \gamma}$$

Otherwise $$f_{Plane} = 0$$

Where the coefficients $\alpha$, $\beta$, $\gamma$, A, B $\in \mathbb{R}$ [0 . . . 1] and $\text{pitch}_{max}$, $\text{roll}_{max} \in \mathbb{R}$ [0 . . . 90°] make it possible to adjust the confidence level according to a specific scenario.

The same approach can be applied to the calculation of $Q_{offset_i}$.

Once the addition or subtraction values have been calculated, they are added to or removed from the measurement values in the database where the measurement values are stored and/or in the report created in step 312.

In a sub-step 315, the report comprising the measured values and the modified values is sent by the user equipment 10 to the attachment base station 21. The report comprises the values associated with the cells for which the attachment base station 21 has requested information.

The method 30 for optimising handover further comprises four steps 32 to 35 implemented by the attachment base station 21 represented in FIG. 3.

In a step 32, the attachment base station 21 receives the report.

In a step 33, the attachment base station 21 selects a base station from the report received by the attachment base station 21. This selection is conventionally carried out especially from the measurement values included in the report. The measurement values taken into account are then either authentic measurement values, that is, actually measured, or measurement values modified in sub-step 314 of step 31 by the user equipment 10 which has made the decision to promote or handicap certain base stations in the report.

Figure 5:
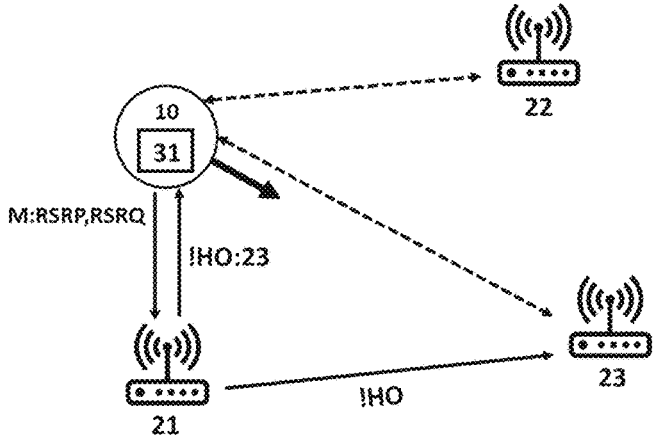
FIG. 5 shows a system implementing the methods according to the invention.

In steps 34 and 35, and as represented in FIG. 5, the attachment base station 21 initiates the handover by sending, in step 34, a communication "!HO" so that the base station 23 can prepare resources necessary for the handover and then sends, in step 35, a communication "!HO:23" to the user equipment 10, informing it of this change of attachment base station.

In an alternative embodiment, the preselection method 31 may be implemented by a device in the network other than the user equipment 10, for example by the attachment base station 21. For this, the user equipment 10 transmits to the attachment base station 21 information, for example of altitude, attitude, speed and about its antenna(s), so that the attachment base station can implement the steps of preselecting 313 and modifying 314 the measurement value(s), the measurements having been carried out by the user equipment 10. This alternative is represented in FIG. 6.

Figure 6:
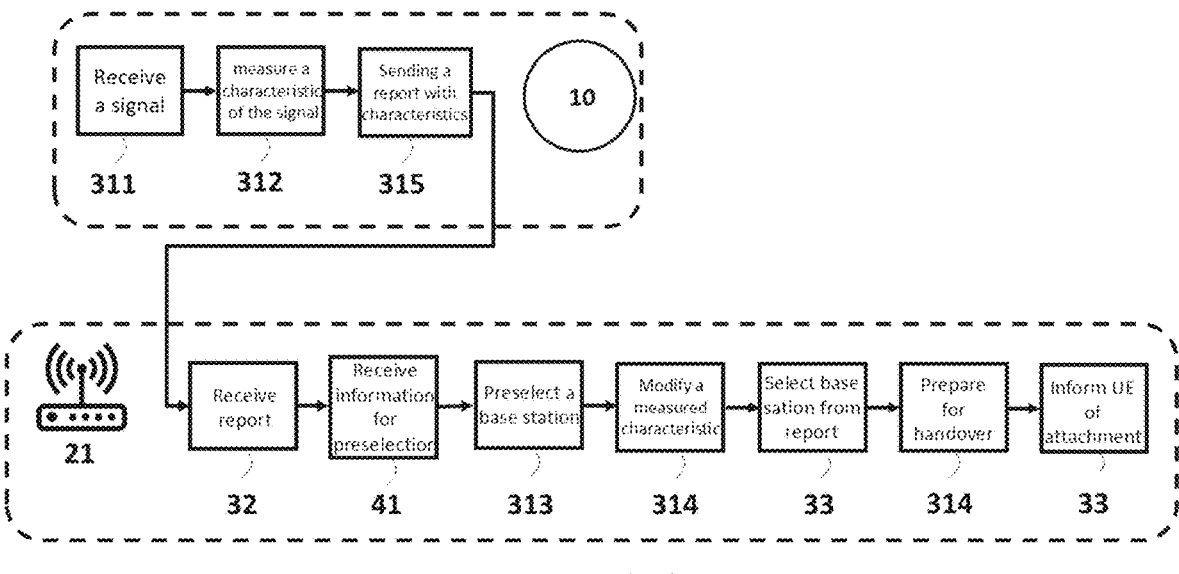
FIG. 6 shows a schematic representation of a method for preselecting base stations according to another embodiment of the invention.

As described in FIG. 6, in this alternative embodiment, the user equipment 10 still implements the steps of receiving 311 signals from base stations 22 to 27 and measuring 312 at least one characteristic of these signals and creating a report, as well as the step 315 of sending the report to the attachment base station 21. The user equipment 10 also transmits information on which the criteria for the user equipment 10 used for the preselection 313 are based. This information is for example information from the user equipment 10 relating to its altitude, attitude, speed and about its antenna(s).

The attachment base station 21 still implements the steps 32 and 33 to 35 already previously described, that is, receiving the report 32, selecting 33 a future attachment base station and initiating 34 and 35 the handover.

In this alternative embodiment, the attachment base station also implements a step 41 of receiving information from the user equipment 10, this information is subsequently used for the preselection criteria.

Finally, the attachment base station 21 implements the steps of preselecting 313 at least one base station and modifying 314 the measurement values for that preselected base station, before implementing the subsequent steps 33-35. Thus, steps 41 and 313 to 314 are interposed between the steps of receiving the report 32 and selecting a base station to carry out a handover 33. The base station carries out the steps 313 and 314 of preselecting and changing the value based on the information on the user equipment 10 received in step 41 and the report measurement values received in step 32.

The invention claimed is:

1. A method for preselecting at least one base station from a plurality of base stations, a user equipment and the plurality of base stations being included in a mobile network, the user equipment being an aircraft and being attached to an attachment base station of the plurality of base stations, each base station forming a cell of the mobile network, the method comprising:
   receiving, by the user equipment, a signal from each base station of the plurality of base stations,
   measuring, by the user equipment, at least one characteristic of each signal received from the plurality of base stations, the measuring comprising assigning at least one value associated with each base station according to the at least one characteristic of each signal and creating a report comprising all the assigned values,
   preselecting at least one base station from the plurality of base stations according to at least one criterion relating to the user equipment and the measurement carried out in the measuring,
   modifying at least one value of the report created in the measuring, the at least one modified value being associated with the at least one preselected base station;
   the at least one criterion relating to the user equipment taking account of at least one of the information on the user equipment among:
      a pitch of the user equipment,
      a roll of the user equipment,
      a yaw of the user equipment,
      at least one piece of information about a plurality of antennas of the user equipment.

2. The preselection method according to claim 1, wherein the modifying at least one value of the report, the at least one value is modified by adding or subtracting a predetermined value.

3. The preselection method according to claim 2, wherein the predetermined value is added to or subtracted from the at least one value of the report when the base station associated with the value belongs to the at least one preselected base station.

4. The preselection method according to claim 2, wherein the predetermined value is predetermined according to the at least one piece of information taken into account.

5. The preselection method according to claim 1, wherein the at least one criterion is chosen from:
   a direction of the cell of each base station, determined from the arrangement of the antennas of the user equipment and the value of the measured characteristic of each received signal,
   a confidence level of the user equipment in the environment it is moving towards, determined from the pitch, roll and yaw of the user equipment.

6. The preselection method according to claim 1, wherein the preselecting and modifying are implemented by the user equipment and the preselection method further comprises sending the report to the attachment base station.

7. The preselection method according to claim 1, wherein the preselecting and modifying are implemented by the attachment base station and the preselection method further comprises, prior to the preselecting and modifying, receiving the report by the attachment base station.

8. The preselection method according to claim 7, further comprises, prior to the preselecting and modifying, receiving at least one of the information on the user equipment by the attachment base station.

9. A system comprising:

at least one piece of user equipment configured to implement the preselection method according to claim 6, the user equipment being an aircraft;

a plurality of base stations comprising at least one attachment base station to which the user equipment is attached.

10. A system comprising:

at least one piece of user equipment, the user equipment being an aircraft;

a plurality of base stations comprising at least one attachment base station to which the user equipment is attached, the at least one base station being configured to implement the preselection method according to claim 7.

11. A non-transitory computer-readable recording medium comprising instructions which, when executed by a computer, cause the same to implement the preselection method according to claim 1.

12. A system comprising:

at least one piece of user equipment, the user equipment being an aircraft;

a plurality of base stations comprising at least one attachment base station to which the user equipment is attached, the at least one base station being configured to implement the preselection method according to claim 8.

\* \* \* \* \*